US006789837B2

(12) United States Patent
Mitsui et al.

(10) Patent No.: US 6,789,837 B2
(45) Date of Patent: Sep. 14, 2004

(54) VEHICLE BODY STRUCTURE

(75) Inventors: Jun Mitsui, Utsunomiya (JP); Tsuyoshi Higuchi, Shioya-gun (JP); Kanji Fujii, Utsunomiya (JP); Yoshitomo Ihashi, Utsunomiya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/440,628

(22) Filed: May 19, 2003

(65) Prior Publication Data

US 2003/0218357 A1 Nov. 27, 2003

(30) Foreign Application Priority Data

May 23, 2002 (JP) ....................................... 2002-149726

(51) Int. Cl.$^{7}$ .................................................. B60J 5/10
(52) U.S. Cl. ...................................... 296/146.8; 296/56
(58) Field of Search ................................ 296/146.8, 56, 296/106; 49/339–342, 354, 356

(56) References Cited

U.S. PATENT DOCUMENTS 6,283,535 B1 * 9/2001 Yuge ....................... 296/146.8
6,382,706 B2 * 5/2002 Yuge et al. .............. 296/146.4
6,478,357 B2 * 11/2002 Zhou ........................... 296/56
6,550,839 B2 * 4/2003 Rogers et al. ................ 296/56

* cited by examiner

*Primary Examiner*—Stephen Gordon
(74) *Attorney, Agent, or Firm*—Rankin, Hill, Porter & Clark LLP

(57) ABSTRACT

A vehicle body structure comprises: a side roof rail, a rear roof rail, and a rear pillar, which are disposed in the rear portion of an vehicle body, and which intersect each other at an intersecting portion; a rear door provided for optionally opening and closing a rear port of the vehicle body; an automatic opening and closing unit disposed inside the vehicle body and in the vicinity of the intersecting portion; an aperture provided in the intersecting portion; and an arm provided through the aperture for connecting the automatic opening and closing unit to the rear door. The automatic opening and closing unit is fixed to at least the side roof rail, the rear roof rail, and the rear pillar so as to pass above the aperture.

7 Claims, 5 Drawing Sheets

VEHICLE BODY STRUCTURE

BACKGROUND OF THE INVENTION

Field of the Invention

The present invention relates to a vehicle body structure provided with an automatic opening and closing device for a liftback rear cargo door (hereinafter simply referred to as a "rear door").

In recent years, automatic rear doors which are opened or closed by a motor or the like, have become popular in, for example, minivans and wagons.

In most such automatic rear doors, an automatic opening and closing device provided with, for example, a motor or the like is connected to a rear door via an arm or the like, and the rear door is opened or closed by the operation of the arm.

The automatic opening and closing device is preferably provided inside the vehicle and in the vicinity of rear port of the vehicle, and more preferably, in view of the rigidity of the arm, the automatic opening and closing device is provided as rearward as possible so that the movement of the arm and the length of the arm are reduced, so that the arm may be made compact and very rigid, and so that the size of projection due to the opening and closing device into interior space of the vehicle may be minimized.

The arm connects the automatic opening and closing device disposed inside the vehicle to the rear door while penetrating through the body panel. Accordingly, an aperture for the arm is provided in the vicinity of the rear port.

However, a problem is encountered in that the aperture decreases the rigidity of the vehicle body in the vicinity of the rear port where a sufficient rigidity is specifically required.

When normal reinforcing methods, such as increasing thicknesses of elements around the aperture, providing reinforcing patches around the aperture, etc., are employed as countermeasures, problems are encountered in that the weight of the vehicle is increased, and effects of reinforcing may not be sufficient.

SUMMARY OF THE INVENTION

In consideration of the above circumstances, an object of the present invention is to provide a vehicle body structure in which an automatic opening and closing device is effectively used as a reinforcing element, and by which decrease in rigidity of the vehicle body due to the aperture is preferably prevented.

In order to achieve the above object, the present invention provides a vehicle body structure comprising: a side roof rail, a rear roof rail, and a rear pillar, which are disposed in the rear portion of a vehicle body, and which intersect each other at an intersecting portion; a rear door provided for optionally opening and closing a rear port of the vehicle body; an automatic opening and closing device for the rear door disposed inside the vehicle body and in the vicinity of the intersecting portion; an aperture provided in the intersecting portion; and a connecting element provided through the aperture for connecting the automatic opening and closing device to the rear door, wherein the automatic opening and closing device for the rear door is fixed to at least the side roof rail, the rear roof rail, and the rear pillar so as to pass above the aperture.

According to the above vehicle body structure, the automatic opening and closing device for the rear door can be effectively used as a reinforcing element for the intersecting portion of the frame of the vehicle body.

In addition, it is possible to effectively distribute a reaction force from the rear door, which is applied to the automatic opening and closing device for the rear door, when the rear door is opened or closed, to the frame of the vehicle body.

DESCRIPTION OF THE PREFERRED EMBODIMENTS

An embodiment of the present invention will be explained below with reference to FIGS. 1 to 5.

In the following description, the left side elements of the vehicle will be primarily explained; however, the vehicle has mirror-image elements in the right side thereof. The denotations for directions such as front, rear, left and right in the description correspond to the directions in the vehicle.

Figure 1:
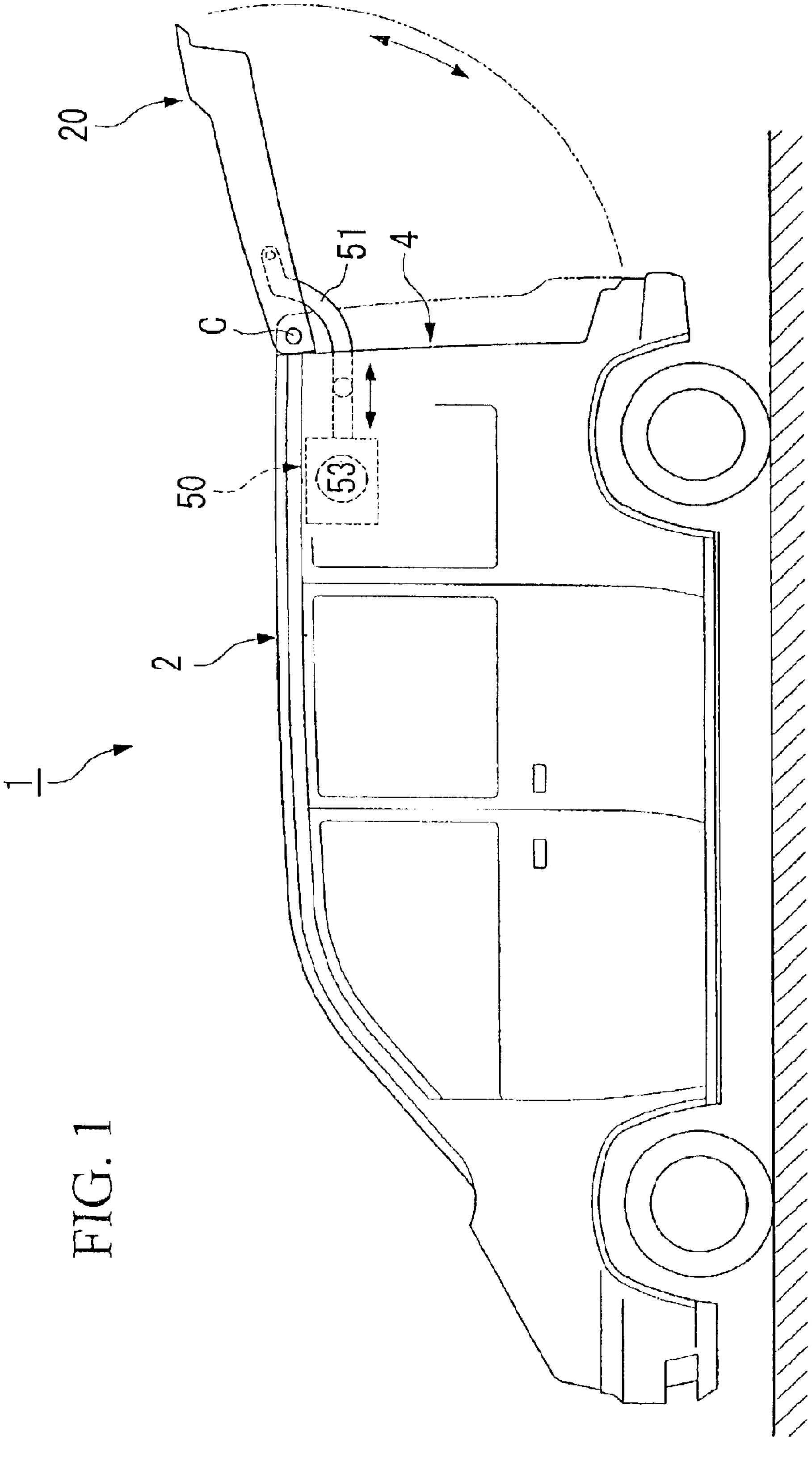
FIG. 1 is a side view showing an embodiment of a vehicle according to the present invention.

As shown in FIG. 1, a vehicle 1 of a minivan type is provided with a rear door 20 at a rear port 4 thereof for optionally opening and closing the rear port 4. The rear door 20 is supported so as to be rotatable up and down about a hinge center C positioned at the rear end of a roof 2.

An automatic opening and closing unit 50 for making the rear door 20 to be an automatic opening and closing type is provided in the vicinity of the hinge center C.

More specifically, the automatic opening and closing unit 50 comprises an arm 51 connected to the rear door 20, and a motor 53 for moving the arm 51 in the longitudinal (front to rear) direction so as to the rear door 20 move up or down for opening or closing of the rear door 20.

Figure 2:
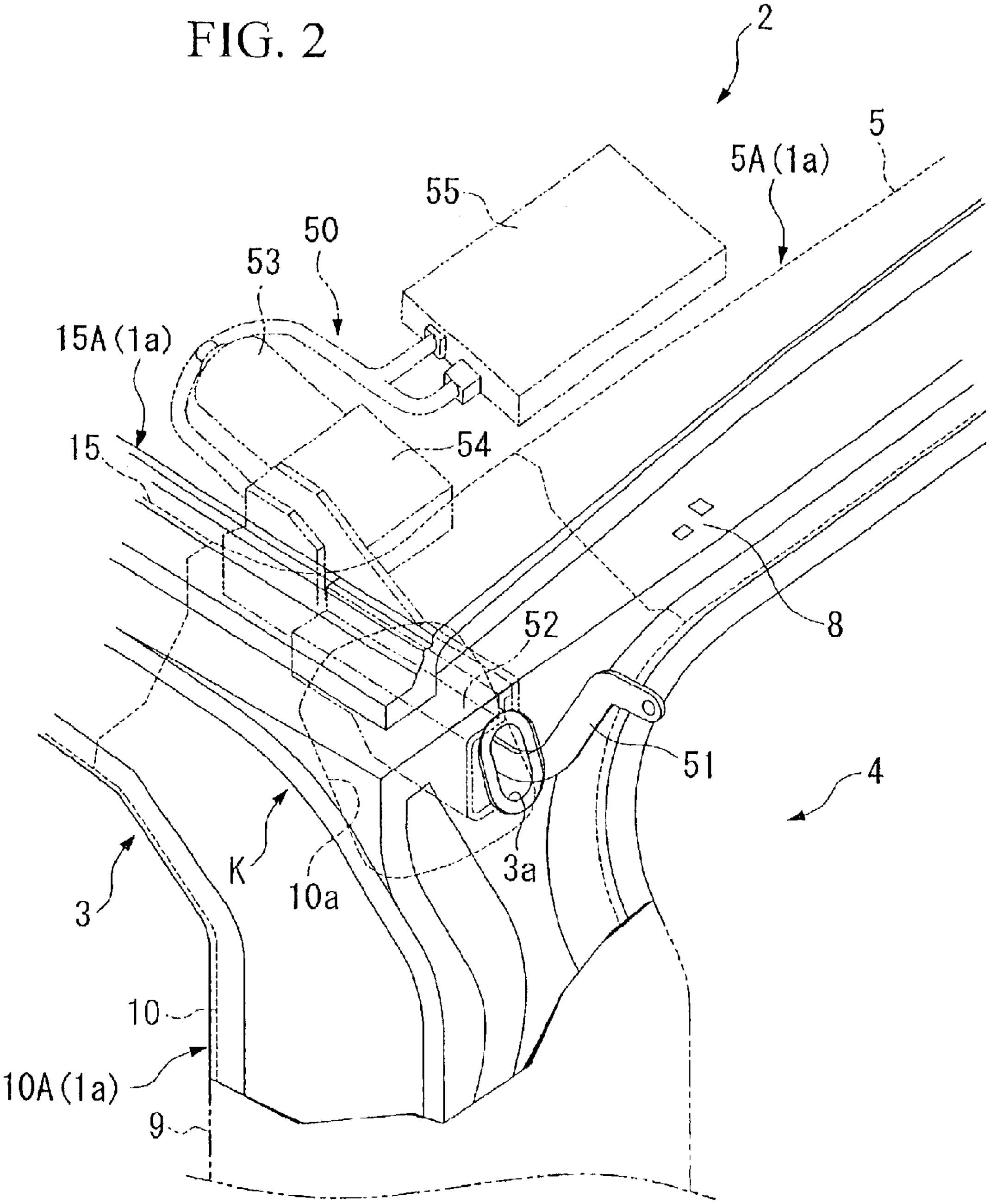
FIG. 2 is a perspective view showing a part of the body structure near the rear port of the vehicle shown in FIG. 1.

As shown in FIG. 2, at the rear end of the roof 2, there is provided a rear roof rail 5 which extends in the lateral direction of the vehicle 1, and which is connected the inner portion of the vehicle body. The area around the meeting of the rear roof rail 5 and the roof 2 forms a rear roof rail portion 5A, which is a portion of a vehicle body frame 1*a*, in the upper portion of a rear port 4. At the upper edge of a body side panel 3, there is provided a side roof rail 15, which extends in the longitudinal direction, and which is connected to the inner portion of the vehicle body. The area around the meeting of the side roof rail 15 and the body side panel 3 forms a side roof rail portion 15A, which is a portion of the vehicle body frame 1*a*.

At the rear end of the body side panel 3, there is provided a rear inner pillar 9, which is connected to the inner portion of the vehicle body. The area around the meeting of the rear inner pillar 9 and the body side panel 3 forms a rear pillar portion 10A, which is a portion of the vehicle body frame 1*a*, in the side portion of the rear port 4.

A rear pillar reinforce 10 is connected to the upper end of the rear inner pillar 9. The front portion of the rear pillar reinforce 10 is connected to the side roof rail 15, and the side portion of the rear pillar reinforce 10 is connected to the rear roof rail 5. Accordingly, the rear pillar reinforce 10 is positioned at an intersecting portion K where the rear pillar portion 10A, the rear roof rail portion 5A, and the side roof rail portion 15A intersect.

In the rear roof rail portion 5A, there is provided a mounting portion 8 for a hinge (not shown) for mounting the rear door 20.

The automatic opening and closing unit 50, to which the arm 51 extending rearward is provided, is disposed in the vicinity of the rear end and the left side of the roof 2.

Because the arm 51 is connected to the rear door 20 at the vicinity of the hinge center C, a short stroke of the arm 51 is sufficient to open or close the rear door 20 (see FIG. 1). In addition, because the automatic opening and closing unit 50 is disposed in the vicinity of the rear end of the roof 2, the arm 51 may be made short. Accordingly, the automatic opening and closing unit 50 can be compact, and high rigidity of the arm 51 can be ensured.

Moreover, because the automatic opening and closing unit 50 is disposed in the vicinity of the left end of the roof 2, the amount of projection at the middle portion of the vehicle 1 may be restrained due to compactness of the automatic opening and closing unit 50 along with disposition of the automatic opening and closing unit 50 in the rear portion of the vehicle 1.

At the intersecting portion K, and in the body side panel 3 and in the rear pillar reinforce 10, there are provided apertures 3*a* and 10*a*, respectively, through which the arm 51 of the automatic opening and closing unit 50 extends so as to be connected to the rear door 20 (see FIG. 1).

A guide element 52, which supports the arm 51 while surrounding the arm 51, is provided to the automatic opening and closing unit 50. The guide element 52 is disposed between a gear case 54 and the body side panel 3. The aperture 10*a* formed in the rear pillar reinforce 10 is made larger than the aperture 3*a* formed in the body side panel 3 so as to accommodate the guide element 52 therethrough.

Figure 3:
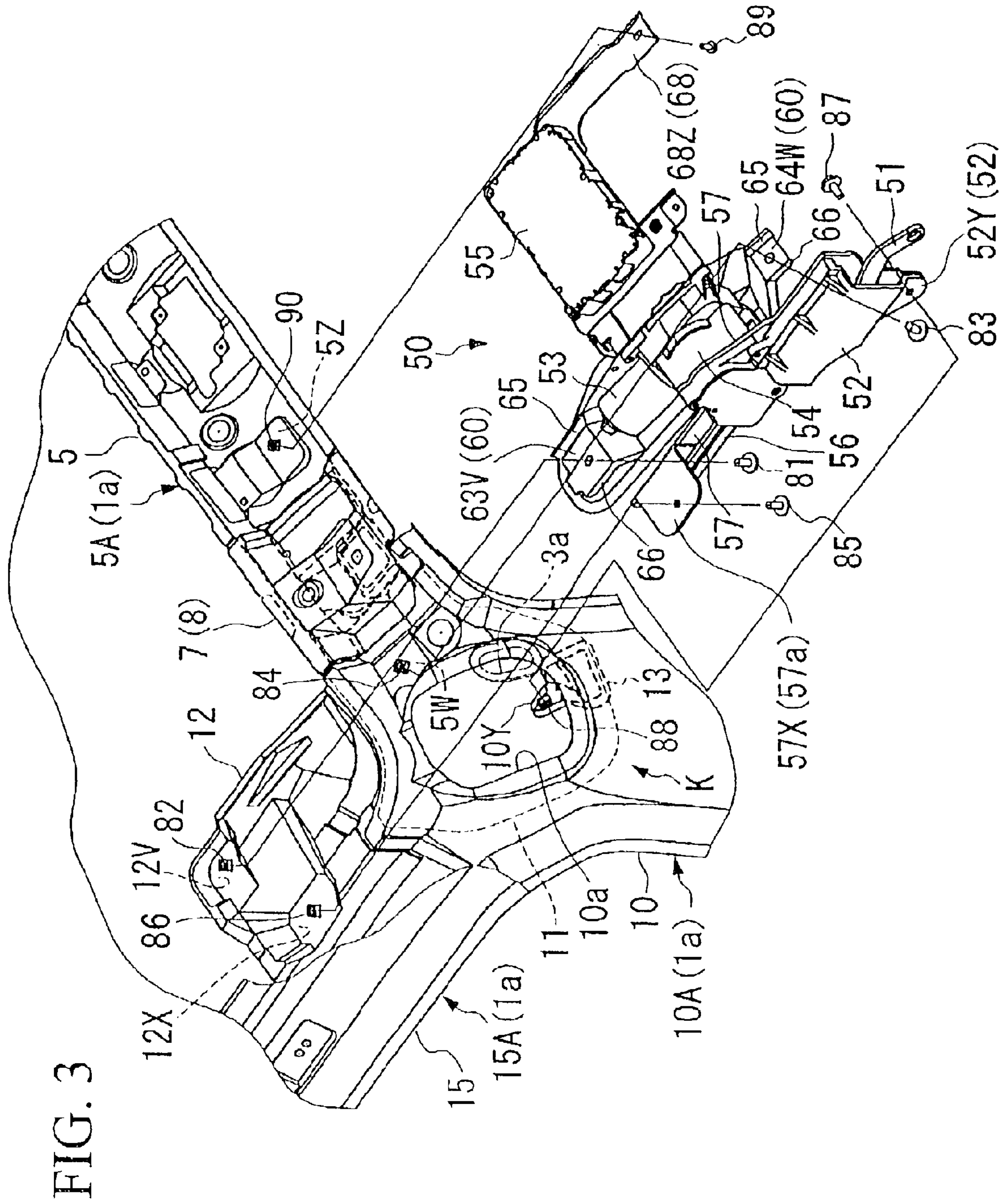
FIG. 3 is an exploded perspective view showing the elements in FIG. 2 in a state in which a roof and a side panel of the vehicle are removed.

As shown in FIG. 3, a rear pillar reinforcing patch 11 is applied to the inner surface of rear pillar reinforce 10 around the aperture 10*a* as indicated by a broken line.

The rear pillar reinforcing patch 11 is formed so as to match the rear pillar portion 10A and the rear roof rail portion 5A. The rear pillar reinforcing patch 11 is connected to the rear pillar portion 10A at a portion below the aperture 10*a*, and extends toward the right to be connected to the rear roof rail portion 5A disposed in the right of the aperture 10*a* (i.e., disposed inside the direction of width) so as to support the underside of a reinforcement 7 disposed at the hinge mounting portion 8.

Above the automatic opening and closing unit 50 and inside the roof 2, there is provided a PTG (power rear door) bracket 12 along the side roof rail 15. The left side edge (outside edge) of the PTG bracket 12 is connected to the side roof rail 15 so as to form a portion of the side roof rail portion 15A of the vehicle body frame 1*a*.

The rear end of the PTG bracket 12 is connected to the front end (upper end) of the rear pillar reinforcing patch 11. The PTG bracket 12 and-the rear pillar reinforcing patch 11, as substantially an integrated element, cover the vicinity of the intersecting portion K from the inside of the vehicle body.

In the right of the front end of the PTG bracket 12, a fixing portion 12V for the automatic opening and closing unit 50 is provided in substantially a horizontal manner, and another fixing portion 12X for the automatic opening and closing unit 50 is provided in substantially a horizontal manner in the left and slightly rearward with respect to the fixing portion 12V.

In the right of the aperture 10*a* formed in the rear pillar reinforcing patch 11, i.e., in the rear roof rail portion 5A of the vehicle body frame 1*a*, another fixing portion 5W for the automatic opening and closing unit 50 is provided in a manner inclined rearward.

On a portion below the aperture 10*a* formed in the rear pillar reinforcing patch 11, i.e., on the rear pillar portion 10A of the vehicle body frame 1*a*, a stay 13 is connected to provide a fixing portion 10Y which extends substantially perpendicular to the direction of vehicle width.

In the right of the reinforcement 7, another fixing portion 5Z for the automatic opening and closing unit 50 is formed in the underside of the rear roof rail 5 so as to have a concave shape.

Figure 4:
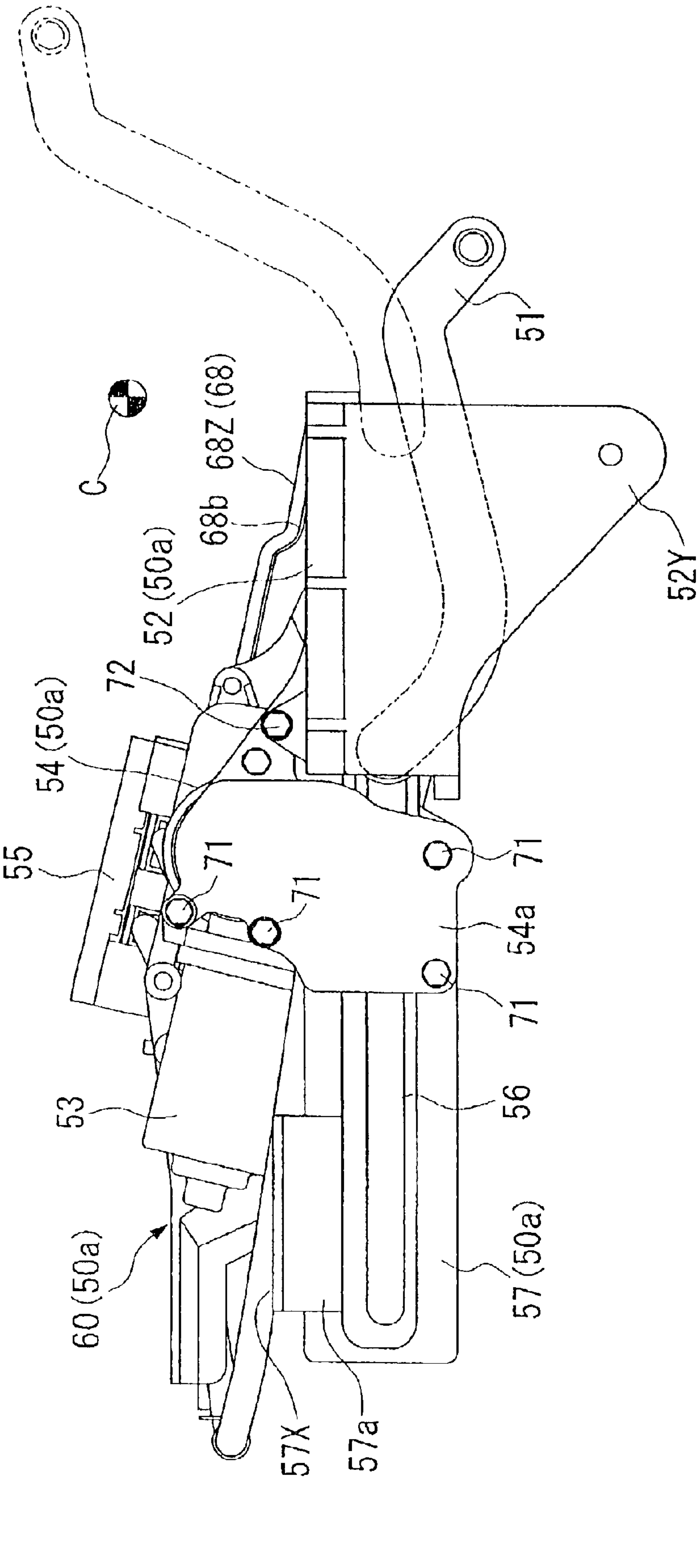
FIG. 4 is a side view showing an automatic opening and closing device for a rear door.
Figure 5:
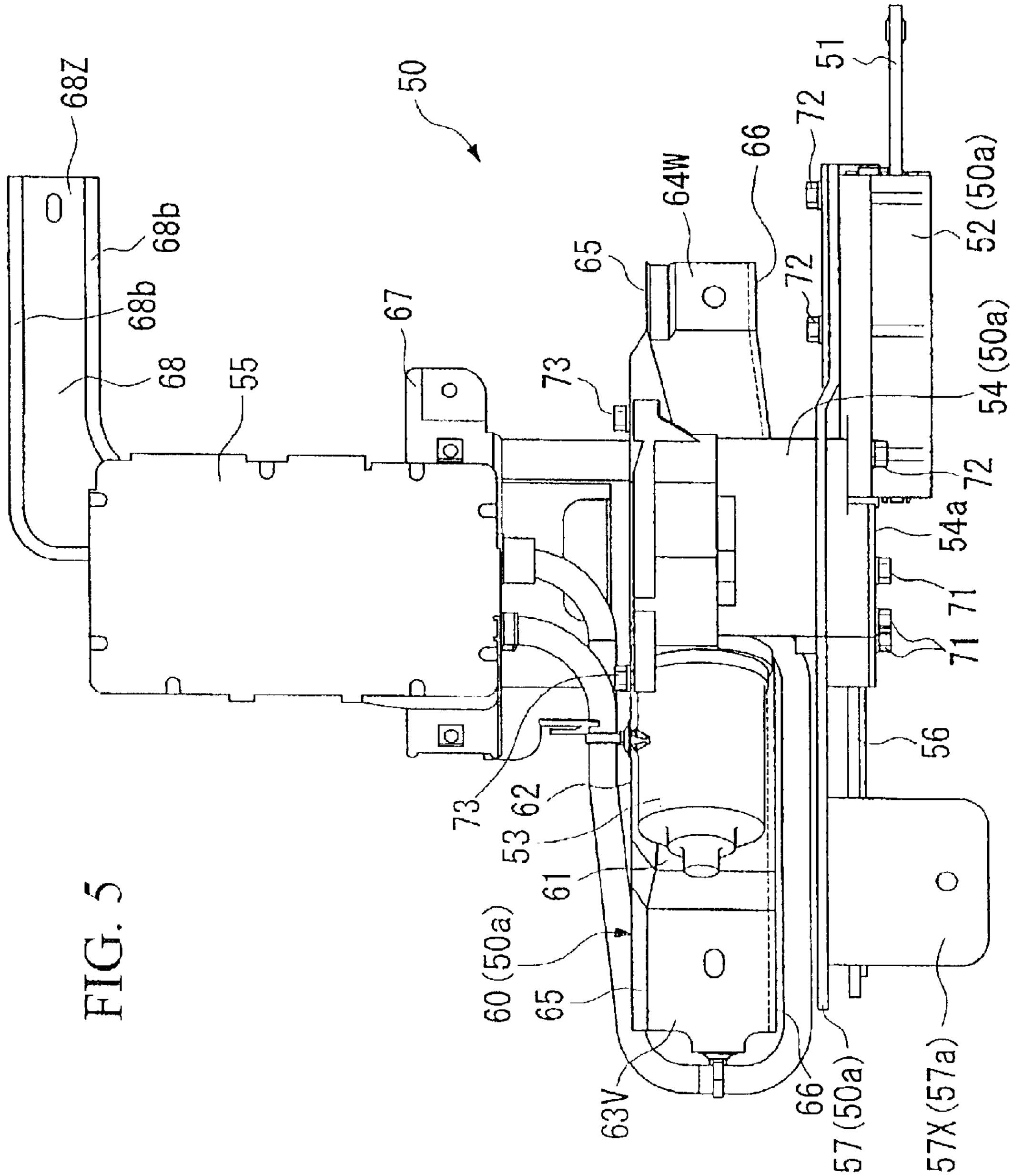
FIG. 5 is a plan view showing the automatic opening and closing device for the rear door shown in FIG. 4.

As shown in FIGS. 3 to 5, the motor 53 of the automatic opening and closing unit 50 has a rotational shaft extending substantially in the longitudinal direction. The gear case 54 is connected to the rear end of the motor 53. A rack 56 connected to the gear case 54 is moved back and forth by the rotation of the motor 53.

A gear case cover 54*a* is fixed to the gear case 54 by bolts 71 along with a base frame 57 which has a thick plate shape, and which is disposed substantially in parallel to the rack 56.

Both front and rear portions of the base frame 57 are formed as strips. The front portion of the base frame 57 extends to a position corresponding to the front end of the rack 56 in a state in which the rack 56 is moved to the front, and the rear portion of the base frame 57 extends to a position corresponding to the rear end of the rack 56 in a state in which the rack 56 is moved to the rear.

A guide element 52 is mounted on the base frame 57 using a bolt 72. The guide element 52 supports the rear end portion of the rack 56 in the lateral direction while allowing the back and forth movement of the rack 56.

A mounting bracket 57*a* having a thick plate shape is connected to the front portion of the base frame 57. A mounting portion 57X formed in the mounting bracket 57*a* corresponds to the fixing portion 12X of the PTG bracket 12.

The rear end portion of the guide element 52 extends downward in which a mounting portion 52Y, which corresponds to the fixing portion 10Y of the stay 13, is provided. The extending portion of the guide element 52 is formed substantially in a triangular shape, in which the mounting portion 52Y is provided at one of vertexes, so that a sufficient rigidity of the mounting portion 52Y is ensured.

An end of the arm 51, which is cut out in a crankshaft shape, is connected to the rear end of the rack 56 so as to allow vertical pivot movement of the arm 51, and the other end of the arm 51 is connected to the rear door 20 (see FIG. 20).

Accordingly, when the arm 51 is moved in the longitudinal direction, along with the rack 56, by the drive force of the motor 53, the rear door 20 is vertically pivoted about the hinge center C, automatically.

FIGS. 4 and 5 show the automatic opening and closing unit 50 in a state in which the rack 56 is moved forward, and the rear door 20 is closed. In FIG. 4, the arm 51 in a state in which the rear door 20 is closed is indicated by two-dot chain lines.

The motor 53 and the gear case 54 are provided with a mount frame 60, whose bottom wall 61 and side wall 62 cover the bottom portions and right portions of the motor 53 and the gear case 54, respectively, and which is fixed to the right face and bottom face (not shown) of the gear case 54 using bolts 73.

Mounting portions 63V and 64W, which respectively correspond to the fixing portion 12 V for the PTG bracket and the fixing portion 5W for the rear pillar reinforcing patch 11, are formed in the front end and rear end portions of the mount frame 60, respectively.

At the right ends of the mounting portions 63V and 64W, there are formed flanges 65, respectively, both of which are continuously connected to the side wall 62. At the left ends of the mounting portions 63V and 64W, there is formed a downward-extending flange 66 which extends from the front end to the rear end of the mount frame 60 so as to increase the rigidities of the mounting portions 63V and 64W.

The mount frame 60 and the base frame 57 are connected to each other via the gear case 54. The mount frame 60, the base frame 57, the gear case 54, and the guide element 52 together form a frame portion 50*a* of the automatic opening and closing unit 50.

In the right of the gear case 54, there is provided a control unit 55 for the automatic opening and closing unit 50. The left end of the control unit 55 is supported by a first bracket 67 which is connected to the right end of the mount frame 60, and the right end of the control unit 55 is supported by a second bracket 68 which forms a mounting portion 68Z that corresponds to the fixing portion 5Z of the rear roof rail 5.

The second bracket 68 extends from the bottom face of the control unit 55 to the right of the control unit 55 while also turning substantially at a right angle and extending rearward. In both side edges of the second bracket 68, there are formed stepped portions 68*b* so as to increase rigidity of a mounting portion 68Z formed at the rear end of the second bracket 68.

As shown in FIG. 3, the fixing portion 12V of the PTG bracket 12 is fixed to the mounting portion 63V of the mount frame 60 using a bolt 81 and a nut 82. The fixing portion 5W of the rear pillar reinforcing patch 11 is fixed to the mounting portion 64W of the mount frame 60 using a bolt 83 and a nut 84.

Moreover, the fixing portion 12X of the PTG bracket 12 is fixed to the mounting portion 57X of the mount bracket 57*a*, which is connected to the base frame 57, using a bolt 85 and a nut 86. The fixing portion 10Y of the stay 13, which is connected to the rear pillar reinforcing patch 11, is fixed to the mounting portion 52Y of the guide element 52 using a bolt 87 and a nut 88.

In addition, the fixing portion 5Z of the rear roof rail 5 is fixed to the mounting portion 68Z of the second bracket 68, which is connected to the control unit 55, using a bolt 89 and a nut 90.

According to the vehicle body structure explained above, the automatic opening and closing unit 50 for the rear door 20 can be fixed to the rear roof rail portion 5A, to the side roof rail portion 15A, and to the rear pillar portion 10A, which together form the vehicle body frame 1*a*, in such a manner that the automatic opening and closing unit 50 passes above the apertures 3*a* and 10*a* formed in the intersecting portion K of the vehicle body frame 1*a*.

More specifically, the mounting portions 63V and 57X of the automatic opening and closing unit 50 are respectively fixed to the fixing portions 12V and 12X which are formed in the PTG bracket, and which are located forward with respect to the apertures 3*a* and 10*a*. The mounting portion 64W of the automatic opening and closing unit 50 is fixed to the fixing portion 5W which is formed in the rear pillar reinforcing patch 11, and which is located in the right of the apertures 3*a* and 10*a*. The mounting portion 52Y of the automatic opening and closing unit 50 is fixed to the fixing portion 10Y which is formed in the stay 13, and which is located below the apertures 3*a* and 10*a*.

By fixing the automatic opening and closing unit 50 to the vehicle body frame 1*a* in a manner explained above, the automatic opening and closing unit 50 acts as a reinforcement for the intersecting portion K, and thus decrease in the rigidity of the intersecting portion K due to the apertures 3*a* and 10*a* can be prevented, and as a result, the rigidity of the vehicle body having an automatic opening and closing rear door can be sufficiently ensured.

In addition, the reaction force from the rear door 20, which is applied to the automatic opening and closing unit 50 via the arm 51, can be evenly distributed to the rear roof rail portion 5A, the side roof rail portion 15A, and the rear pillar portion 10A; therefore, mounting rigidity of the automatic opening and closing unit 50 can be enhanced.

Moreover, the above-explained structure may be easily applied to vehicles having conventional body structures because mounting portion for the automatic opening and closing unit 50 can be formed just by adding the rear pillar reinforcing patch 11, the PTG bracket 12, and the like to portions where the automatic opening and closing unit 50 is to be mounted without applying a specific structure to the vehicle body frame 1*a*.

The present invention is not limited to the above embodiment, and for example, the above vehicle body structure may be applied to the right side of the vehicle body frame 1*a*.

In the case of the automatic opening and closing unit 50 in the above embodiment, the second bracket 68, which supports the control unit 55, is not directly connected to the frame portion 50*a*; however, the second bracket 68 and the frame portion 50*a* may be integrated, or the second bracket 68 may be securely connected to the frame portion 50*a*, so that the second bracket 68 can be effectively used as a reinforcement which is connected to the rear roof rail 5A, and as a result, the intersecting portion K can be effectively reinforced.

Advantageous Effects Obtainable by the Invention

As explained above, according to the present invention, it is possible to effectively use the automatic opening and closing unit as a reinforcing element for the vehicle body frame, and decrease in the rigidity of the intersecting portion K due to the apertures 3*a* and 10*a* can be prevented; therefore, the rigidity of the vehicle body having an automatic opening and closing rear door can be sufficiently and rationally ensured.

In addition, the reaction force from the rear door, which is applied to the automatic opening and closing unit, can be distributed to the vehicle body frame; therefore, mounting rigidity of the automatic opening and closing unit can be enhanced.

What is claimed is:

1. A vehicle body structure comprising:

a side roof rail, a rear roof rail, and a rear pillar, which are disposed in the rear portion of a vehicle body, and which intersect each other at an intersecting portion;

a rear door provided for optionally opening and closing a rear port of the vehicle body;

an automatic opening and closing device for the rear door, said automatic opening and closing device being disposed inside the vehicle body and in the vicinity of the intersecting portion;

an aperture provided in the intersecting portion; and a connecting element extending through the aperture for connecting the automatic opening and closing device to the rear door, wherein the automatic opening and closing device is fixed to least the side roof rail, the rear roof rail, and the rear pillar.

2. The vehicle body structure according to claim 1, wherein said automatic opening and closing device includes a motor and a control unit, and wherein said motor and control unit are disposed within said vehicle body at a vertical location that is relatively above said aperture at said intersecting portion.

3. The vehicle body structure according to claim 1, further comprising a rear pillar reinforcing patch and a bracket that are disposed within said vehicle body, said patch and bracket cooperating with one another to cover an area adjacent the intersecting portion.

4. The vehicle body structure according to claim 3, wherein the patch is connected to the rear pillar at a location below the aperture.

5. The vehicle body structure according to claim 4, wherein the patch is connected to the roof rail at a location laterally spaced from the aperture.

6. The vehicle body structure according to claim 3, wherein the bracket is connected to the side roof rail.

7. The vehicle body structure according to claim 1, further comprising a rear pillar reinforcing patch and a bracket that are disposed within said vehicle body, said patch being connected to the rear pillar at a location relatively below the aperture and being connected to the rear roof rail at a location spaced laterally from the aperture, said bracket being connected to the side roof rail, wherein said patch and bracket are affixed to one another so as to define a substantially integrated structural element that covers the area adjacent the intersecting portion.

* * * * *